US009203231B2

United States Patent
Samuelson et al.

(10) Patent No.: US 9,203,231 B2
(45) Date of Patent: Dec. 1, 2015

(54) PLUG-ON NEUTRAL BREAKERS AND RELATED METHODS

(71) Applicant: Eaton Corporation, Cleveland, OH (US)

(72) Inventors: Eric Alan Samuelson, Springfield, IL (US); Tony Ray Benson, White Heath, IL (US)

(73) Assignee: Eaton Corporation, Cleveland, OH (US)

( * ) Notice: Subject to any disclaimer, the term of this patent is extended or adjusted under 35 U.S.C. 154(b) by 240 days.

(21) Appl. No.: 13/873,650

(22) Filed: Apr. 30, 2013

(65) Prior Publication Data

US 2014/0321005 A1    Oct. 30, 2014

(51) Int. Cl.
*H01H 73/06* (2006.01)
*H02H 3/16* (2006.01)
*H01H 69/00* (2006.01)
*H01H 73/18* (2006.01)
*H01H 71/08* (2006.01)
*H01R 25/16* (2006.01)

(52) U.S. Cl.
CPC .............. *H02H 3/16* (2013.01); *H01H 71/08* (2013.01); *H01R 25/162* (2013.01); *Y10T 29/49117* (2015.01)

(58) Field of Classification Search
CPC ....... H01H 73/06; H01H 73/18; H01H 69/00; H02H 3/16
USPC .......................................................... 361/115
See application file for complete search history.

(56) References Cited

U.S. PATENT DOCUMENTS 3,922,586 A * 11/1975 Buxton et al. ................ 361/643
5,768,081 A *  6/1998 Cohen et al. ................. 361/119
2011/0002089 A1  1/2011 Sharp

OTHER PUBLICATIONS

Product Listing, EATON BR Arc Fault, http://www.eaton.com/Eaton/ProductsServices/Electrical/ProductsandServices/Residential/LoadcentersandCircuitBreakers/BRCircuitBreakers/BRArcFault/index.htm, Captured Aug. 23, 2012 using Wayback Machine.*
Product Brochure, EATON 60 Circuit Plug-on Neutral Loadcenter, 4 pages, © 2011.
Product Listing, EATON BR Arc Fault, http://www.eaton.com/Eaton/ProductsServices/Electrical/Productsa . . . 1 page, Date unknown but believed to be prior the filed of the present application, printed from the internet Mar. 8, 2013.

* cited by examiner

*Primary Examiner* — Thienvu Tran
*Assistant Examiner* — Kevin J Comber
(74) *Attorney, Agent, or Firm* — Myers Bigel Sibley & Sajovec, P.A.

(57) ABSTRACT

Plug-on neutral circuit breakers include an AFCI OR GFCI circuit breaker housing, a neutral conductor with an external end portion extending from the AFCI/GFCI circuit breaker housing, and a clip assembly attached to the neutral conductor at a specific length configured to align with the loadcenter neutral bar location. The clip assembly includes a conductive clip with downwardly extending, spaced apart legs. The legs are sized and configured to clamp against opposing sides of a neutral bar.

19 Claims, 7 Drawing Sheets

PLUG-ON NEUTRAL BREAKERS AND RELATED METHODS

FIELD OF THE INVENTION

The present invention relates to branch breakers and may be particularly suitable for Arc Fault (AFCI) or Ground Fault (GFCI) breakers.

BACKGROUND OF THE INVENTION

Arc Fault Circuit Interrupters (AFCI) and Ground Fault Circuit Interrupters (GFCI) are among a variety of overcurrent protection devices used for circuit protection and isolation. Arc Fault Circuit Interrupters (AFCIs) reduce fire hazards in electrical circuits by reducing the effects of high current arcing faults as well as detecting persistent low-current arcing faults. Ground Fault Circuit Interrupters reduce the potential of electrical shock. AFCI/GFCI breakers are available as a plug-on branch feeder or combination type breakers from Eaton Corporation. Both branch feeder and combination AFCIs provide conventional thermal and magnetic overcurrent protection. Both also provide high current or "parallel" arcing fault detection and fire mitigation for installed wiring and connected cords. National Electrical Code (NEC) revisions have increased the requirement for sections of the home that require Arc Fault or Ground Fault protection. AFCI and GFCI branch breakers take a longer time to install into a loadcenter than breakers without the required connection to the neutral bar.

SUMMARY OF EMBODIMENTS OF THE INVENTION

Embodiments of the present invention are directed to breakers with a plug-on neutral clip as the neutral terminal for easy load center installation.

The breakers may be particularly suitable as plug-on neutral AFCI/GFCI breakers that can be configured with a clip assembly that can allow for standard mounting of a line side of the breaker and easy "push down" installation of the clip assembly onto a neutral bar.

Embodiments of the invention are directed to Arc Fault Circuit Interrupter (AFCI) circuit breakers and/or Ground Fault Circuit Interrupters (GFCI). The circuit breakers include: a circuit breaker housing, a neutral conductor with an external end portion extending from the circuit breaker housing, and a clip assembly attached to the neutral conductor. The clip assembly includes a conductive clip with downwardly extending, spaced apart legs that are sized and configured to contact opposing sides of a neutral bar.

The legs can be sized and configured to clamp against opposing sides of a neutral bar.

The AFCI circuit breaker can be a Type BR or CH AFCI circuit breaker.

The GFCI circuit breaker can be a Type BR or CH GFCI circuit breaker.

The conductive clip of the clip assembly can be a spring clip or can be part of a spring clip configuration.

The clip assembly can include an electrically insulating cover that extends over at least an upper portion of the clip assembly with the legs of the conductive clip free of the cover.

The cover can have an elongate end portion that extends away from the clip. The cover can have a defined length that is about 6 inches or less than about 6 inches (typically between about 0.1 inches and about 6 inches) and terminates proximate the circuit breaker housing. The cover can encase the conductor therein.

The circuit breaker can include an electrically insulating support member configured to hold the external end portion of the neutral conductor. The support member can be rigid or semi rigid.

The support member and neutral conductor can reside inside an over mold electrically insulating external cover.

The clip assembly can include an upper clip member that snugly abuts the conductive clip so that inner surfaces of the legs of the upper clip member reside against outer surfaces of the legs of the conductive clip. The upper clip member can be an electrical insulator or can have a greater electrical resistivity than the conductive clip.

The conductive clip can be able to move up and down while the clip assembly is attached to the neutral conductor of the AFCI or GFCI circuit breaker.

The clip assembly can be configured to allow a manual "push down" attachment of the conductive clip to the neutral bar whereby the legs of the conductive clip are pushed outward to clamp against downwardly extending sidewalls of the neutral bar.

The end of the neutral conductor can extend through an aperture in a wall of the upper clip member to electrically engage the lower conductive clip.

Some embodiments are directed to methods of installing an Arc Fault Circuit Interrupter (AFCI) or Ground Fault Circuit Interrupter (GFCI) circuit breaker. The methods include: (a) providing an AFCI circuit breaker or Ground Fault Circuit Interrupters (GFCI) with a respective circuit breaker housing and an outwardly extending plug-on neutral clip assembly with a clip having downwardly extending clip legs, the clip assembly is attached to the AFCI or GFCI circuit breaker so that the clip can move up and down relative to the circuit breaker housing; (b) placing the AFCI or GFCI breaker into position on a line bus in a load center having a neutral bar; and (c) pushing down on an upper portion of the clip assembly over the clip to push the clip legs down onto opposing sides of the neutral bar to electrically engage the neutral bar.

The methods can include moving the clip up and down over the neutral bar while the clip assembly remains attached to the AFCI or GFCI circuit breaker housing to facilitate standard mounting of a line side of the respective circuit breaker.

Still other embodiments are directed to methods of fabricating an Arc Fault Circuit Interrupter (AFCI) or Ground Fault Circuit Interrupter (GFCI) circuit breaker. The methods include: (a) providing an AFCI or GFCI circuit breaker with a neutral conductor extending externally from the circuit breaker housing a defined short length; and (b) attaching a conductive clip to the external conductor.

The circuit breaker can be a type BR or CH AFCI/GFCI breaker.

The conductive clip can define or comprise a portion of a spring clip.

The methods can include attaching a first conductive clip member to a second clip member that has increased resiliency relative to the first conductive clip member to provide the conductive clip to be attached to the external neutral conductor.

The conductive clip can be a component of a clip assembly that includes upper and lower clip members attached together with abutting legs.

The conductive clip can be a lower member of a clip assembly. The method can include attaching an insulating overcoat, overmold or other cover to an upper portion of the clip assembly.

The methods can include placing the external neutral conductor on a support member before or during the attaching the conductive clip to the neutral conductor.

Other embodiments are directed to an Arc Fault Circuit Interrupter (AFCI) or Ground Fault Circuit Interrupter (GFCI) circuit breaker that includes a circuit breaker housing and a neutral conductor with an external end portion extending out from the circuit breaker housing. The AFCI or GFCI circuit breaker also includes a flexible clip assembly attached to the neutral conductor. The clip assembly includes a conductive clip with downwardly extending, spaced apart legs configured to be able to move up and down relative to the circuit breaker housing and is sized and configured to contact opposing sides of a neutral bar.

The clip can be a spring clip or form part of a spring clip that is configured to clamp against opposing downwardly extending sidewalls of the neutral bar.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS OF THE INVENTION

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 40, 40', 40", 40'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

The term "spring clip" refers to a substantially U-shaped clip that has legs with sufficient elasticity to be able to resiliently, if not elastically, deform outward to contact a target object.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 1A:
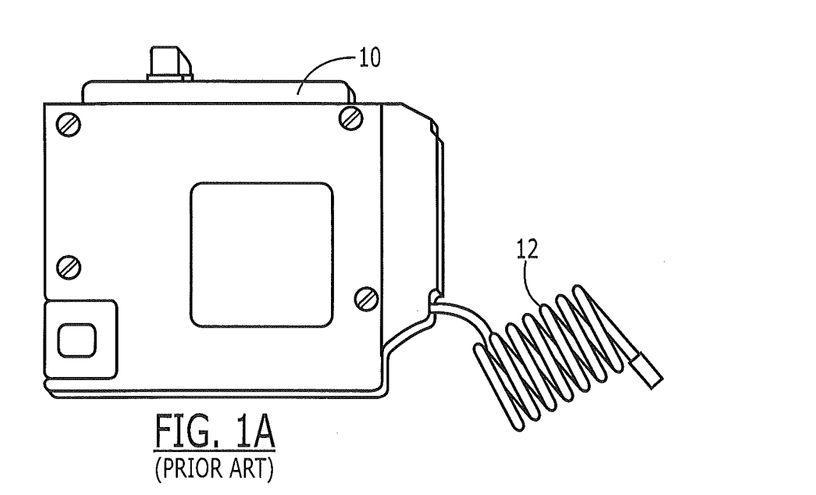
FIGS. 1A and 1B are side and side perspective views of a prior art Type BR AFCI breaker with a coiled neutral terminal attachment configuration.
Figure 1B:
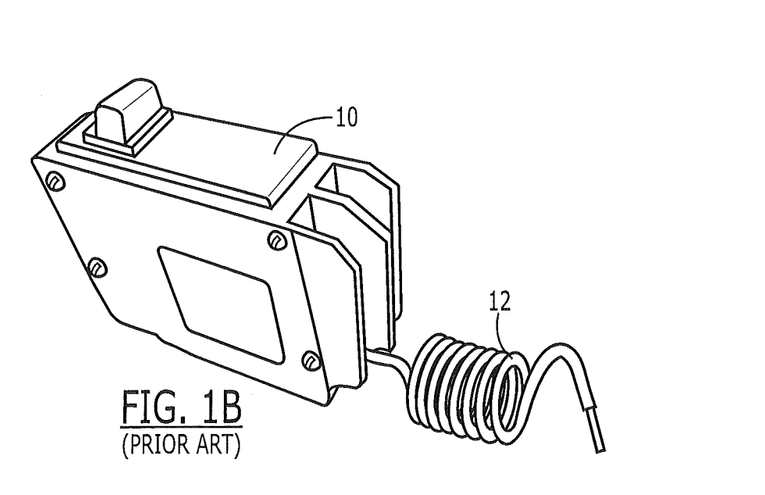
Figure 3:
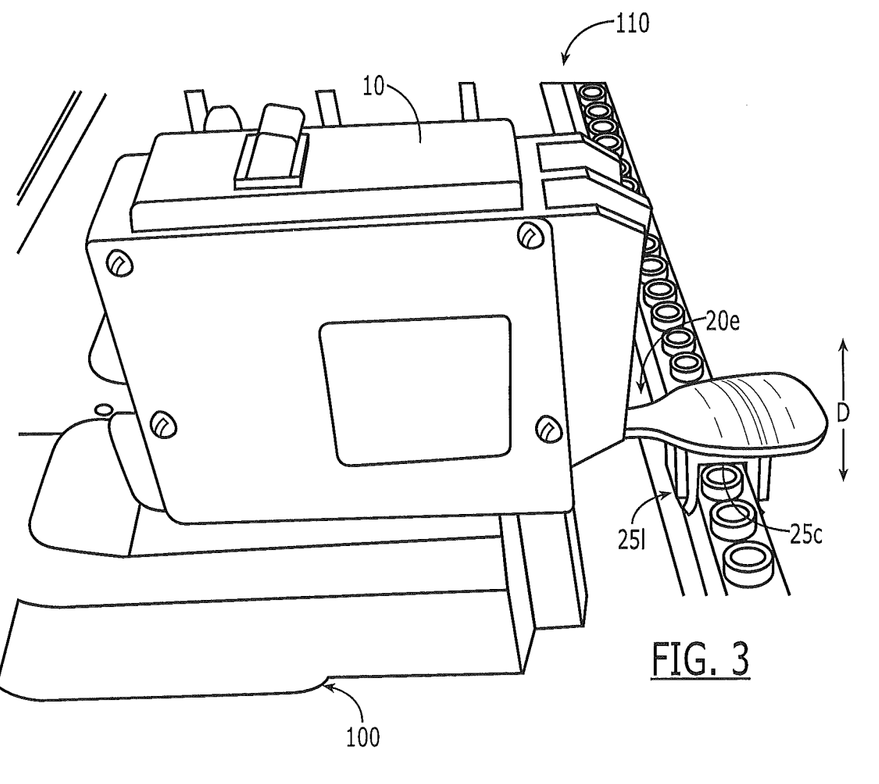
FIG. 3 is a top, side perspective view of the device shown in FIGS. 2A and 2B illustrating the device in an operative position in a load center relative to a line bus and neutral bar according to embodiments of the present invention.

Turning now to the figures, FIGS. 1A and 1B illustrate an example of a known type BR AFCI breaker 10. As shown, the breaker 10 includes a coiled relatively long neutral conductor tail 12 for connecting to a load center 100 (FIG. 3).

Figure 2A:
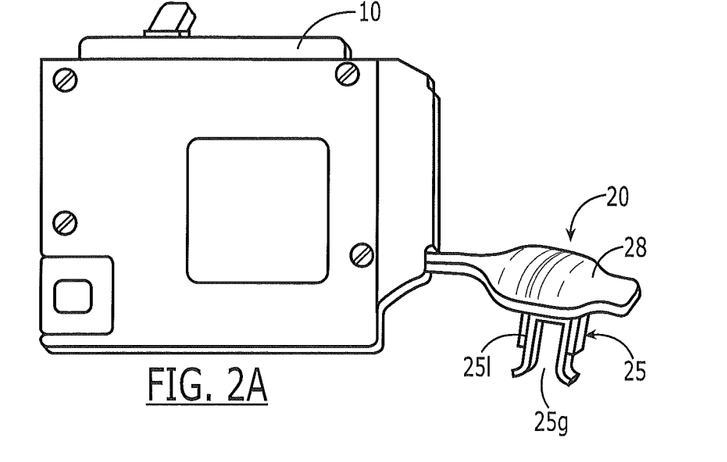
FIG. 2A is a side view of an exemplary AFCI circuit breaker with a plug-on neutral clip assembly for the neutral terminal attachment according to embodiments of the present invention.
Figure 2B:
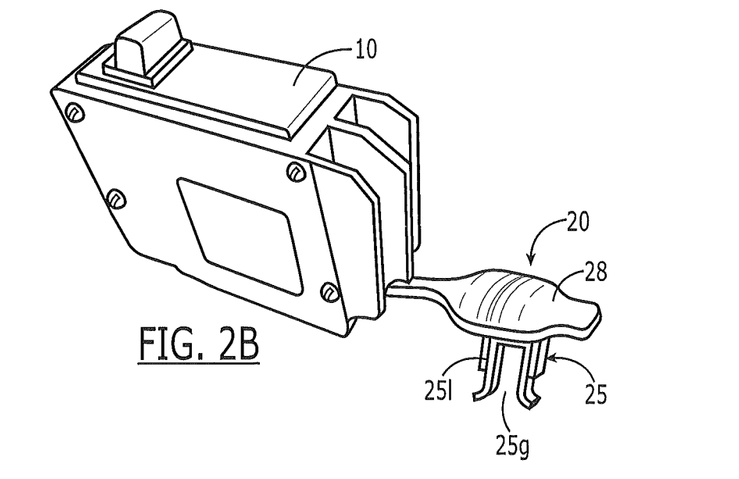
FIG. 2B is a side perspective view of the device shown in FIG. 2A.

As shown in FIGS. 2A and 2B, embodiments of the invention are directed to a relatively compact plug-on neutral clip assembly 20 with a neutral coupling clip 25. As shown in FIG. 3, the assembly 20 attaches to the neutral conductor of the breaker 10 and the clip 25 can be slidably inserted onto the neutral bar 110 of the load center 100. The legs 25l of the clip 25 are conductive or include conductive portions that abut and electrically engage the neutral bar 110 without requiring tools, allowing for efficient installation at load centers. Although shown for an AFCI breaker 10, embodiments of the invention can be used with any AFCI or GFCI breaker, including Type BR or CH breakers.

The neutral clip assembly 20 can be used to replace a pigtail conductor of breakers to connect neutral or ground bars. Embodiments of the invention allow modification of conventional existing breakers 10 to add the neutral clip assembly 20 without requiring expensive, dedicated tooling.

The neutral clip assembly 20 can have an electrically insulating cover 28. The clip legs 25l extend downwardly out of the cover 28. The cover 28 can encase the upper portion of the clip 25 and at least a major length of the conductor 11 that extends out of the housing 10h. The legs 25l are spaced apart and have a gap space 25g therebetween. The gap space 25g can have a width that is sufficient to snugly accommodate the neutral bar 110 so that the legs 25l extend down on opposing sides of the neutral bar 110 in contact therewith (FIG. 3). The gap space 25g can be between about 10%-50% smaller than a width of a target neutral bar 110. In some embodiments, the gap space 25g is between about 0.25 inches to about 0.370 inches for a 0.375 inch bar. The legs 25l can be resiliently configured to be able to flex outward to contact and reside against the downwardly extending outer walls of the neutral bar. Once removed, the legs 25l can (automatically) return to reside closer together with a smaller gap space 25g than when in position on the neutral bar 110. Thus, in some embodiments the clip 25 can act as "spring" clip to clamp against the neutral bar 110.

As shown in FIG. 3, the neutral bar 110 can be a standardized neutral bar with top-mounted screw attachments that are not required to install/use the breaker 10 with the neutral assembly 20.

The crown or bridge 25c of the clip 25 can reside a distance D above the lower end of the legs at a height sufficient to allow the lower ends of the legs to clear the center of the neutral bar 110 and the neutral bar screws (where the neutral bar includes screws). The crown 25c can be substantially planar or may have other shapes to bridge the gap space 25g and connect the two legs 25l of the clip. The legs 25l can have the same or different lengths.

The clip 25 of the clip assembly 20 can be configured to be able to move (e.g., pivot) up and down relative to the breaker 10 while the breaker end 20e of the clip assembly 20 remains attached to the internal or externally accessible neutral terminal, contact or conductor.

Figure 4A:
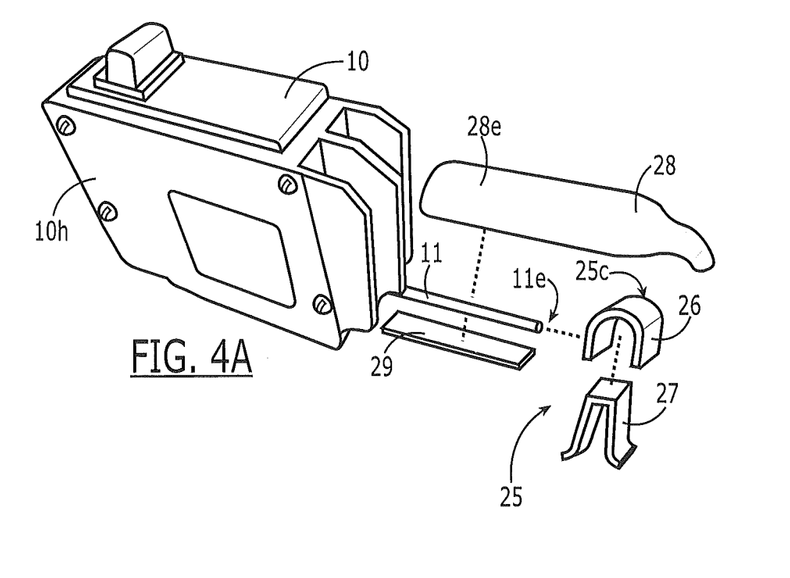
FIG. 4A is a schematic illustration with a partial exploded view of the device shown in FIG. 2A illustrating an exemplary clip configuration according to embodiments of the present invention.
Figure 4B:
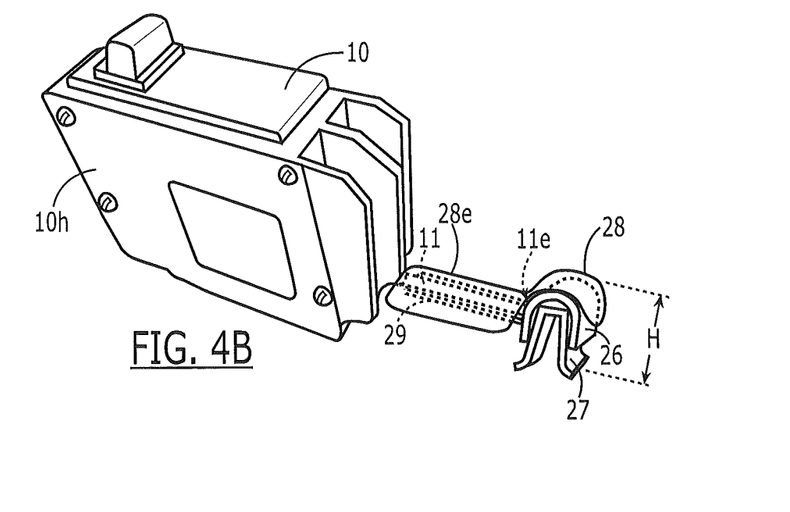
FIG. 4B is a schematic illustration of the device shown in FIG. 4A with the components assembled together according to embodiments of the present invention.

Referring now to FIGS. 4A and 4B, an exemplary configuration of the clip assembly 20 is illustrated. As shown, the clip 25 can include a lower conductive clip member 27 that attaches to an upper clip member 26. The upper clip member 26 can be an electrical insulator or have increased electrical resistance relative to the conductive clip member 27, typically at least ten (10) times the electrical resistance. The upper clip member 26 can also define an outer clip member that snugly abuts the inner clip member 27 and can have more resiliency and/or elasticity than the lower/inner conductive clip member. The clip members 26, 27 can have an inverted, substantially "U" shape.

As shown in FIGS. 4A and 4B, the conductor 11 is attached to the lower clip member 27 to provide an electrical neutral path. The end of the conductor 11e can extend through an aperture (e.g., slot, opening or channel) in the outer clip member 26.

Although shown as two cooperating clip members 26, 27, a single clip member or more than two members may be used.

The two cooperating clip members 26, 27 can be attached together as shown in FIG. 4B. The attachment can be by any suitable means including one or more of adhesive, frictional engagement, slot and rail attachment configurations and the like.

A support member 29 with increased rigidity relative to the conductor 11 can hold the conductor 11 extending from the breaker 10. The conductor 11 may be shorter than conductors 11 used for other type plug-on neutral (e.g., BR AFCI or GFCI) breakers such as those shown in FIGS. 1A and 1B. The conductor 11 typically extends out of the breaker housing 10h a defined or predefined short distance s to a specific length that will allow suitable engagement to the target neutral bar 110 mounted in the loadcenter enclosure. The conductor 11 external length (length out of the housing) can be about 6 inches or less, typically between about 0.1 inches to about 6 inches, such as about 0.25 inches, about 0.5 inches, about 0.75 inches, about 1 inch, about 1.5 inches, about 2 inches, about 2.5 inches, about 3 inches, about 3.5 inches, about 4 inches, about 4,5 inches, about 5 inches, about 5.5 inches or about 6 inches. In some particular embodiments, the conductor 11 may also be substantially flush with the bounds of the housing 10h rather than extend outward therefrom or be recessed therein.

The support member 29 is typically rigid or semi-rigid, e.g., has a body with sufficient rigidity to form a self-supporting shape of an electrically insulating material. The support member 29 can comprise a polymer or other material (e.g., a molded polymeric and/or plastic material). The support member 29 can be a flat splint-like member. The support member 29 can include a slot or channel that slidably receives the conductor 11. The support member 29 can be a sleeve that encases the conductor 11. In some embodiments, e.g., if the sleeve version is used, the cover 28 may terminate proximate an outer end of the clip 25 rather than have an elongate end portion 28e that extends proximate an outer wall of the breaker 10.

In other embodiments, the cover 28 can be configured to hold the conductor 11 without the use of a support member 29. The cover 28 can include, for example, a longitudinally extending slot or channel on an interior wall that holds the conductor 11.

The cover 28 comprises an electrical insulator material such as rubber, plastic or other polymer. The cover 28 can be an overmold that is attached to the conductor 11 and at least an upper portion of the clip 25. The cover 28 can be a unitary integrally molded member. The cover 28 can have a unitary (monolithic) body that is attached to the clip assembly 25. The cover 28 can have an elongate finger 28e that extends between the clip assembly 25 and breaker 10. The cover 28 can be provided as cooperating components. The cover 28 can have a length that is greater than the external length of the conductor 11 as it can extend over the clip assembly 25 as well. The cover 28 can be, for example, between about 0.25 inches to about 3 inches longer than the conductor external length noted above (e.g., between about 0.1 inches to about 6 inches).

The lower member 27 can comprise any suitable conductor material or materials, including one or more of silver, copper, gold, aluminum, beryllium, tungsten or alloys thereof including a brass alloy.

The upper member 26 can comprise one or more of an elastic and/or resilient polymer, stainless steel or a shape memory alloy (SMA) including, for example, nickel-titanium alloys, copper-aluminum-nickel alloys, copper-zinc-aluminum alloys and iron-manganese-silicon alloys.

In some embodiments, the clip 25 includes a single clip member 27 that provides the conductive path for the neutral lower member 27. The single clip member 27 can comprise a SMA or other elastic and suitably conductive material. The single clip member 27 can include a conductive filar or conductive trace on an elastic substrate.

Figure 5:
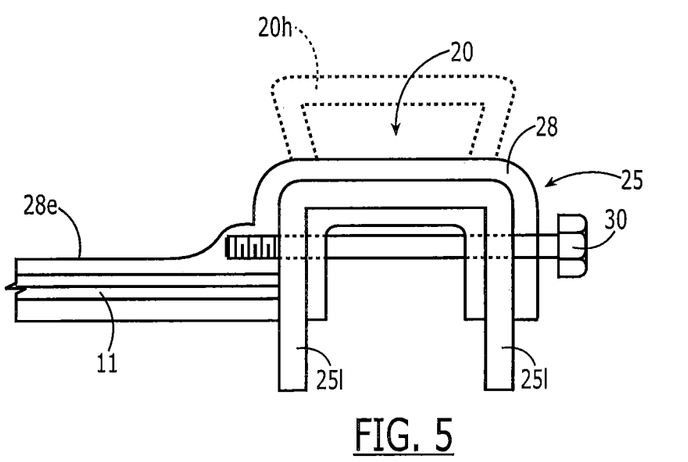
FIG. 5 is a schematic illustration of an alternate embodiment of the clip assembly for the device shown in FIG. 2A according to other embodiments of the present invention.

As shown in FIG. 5, in some embodiments, the clip 25 is not required to be a spring clip to provide the clamping of the legs 25l to the neutral bar 110. As shown, the clip assembly 20 includes an externally accessible member 30 such as a threaded fastener that is in cooperating contact with the legs 25l. For example, the externally accessible member 30 can engage one or both of the legs 25l that can be used to direct the legs 25l to clamp against the neutral bar by reducing the lateral distance between the legs 25l. The member 30 can include an elongate tube or shaft with threads that engage threaded apertures in the legs 25l. In other embodiments, the elongate tube or shaft can frictionally engage the legs and pull one or both legs closer together. The externally accessible member 30 can be covered with an overmold of the cover 28 and depressed with a tactile button to cause the clamp engagement of the legs to the neutral bar 110.

FIG. 5 also illustrates an optional handle 20h that may be attached to or incorporated into the cover 28 for ease in pulling the neutral clip off the neutral bar 110. If used, the handle 20h can take various form factors.

Although not shown, the clip assembly 20 can include biasing members, e.g., coil or leaf springs, belleville or dome washers that cooperate with the legs 25l to provide additional clamp forces.

Figure 6:
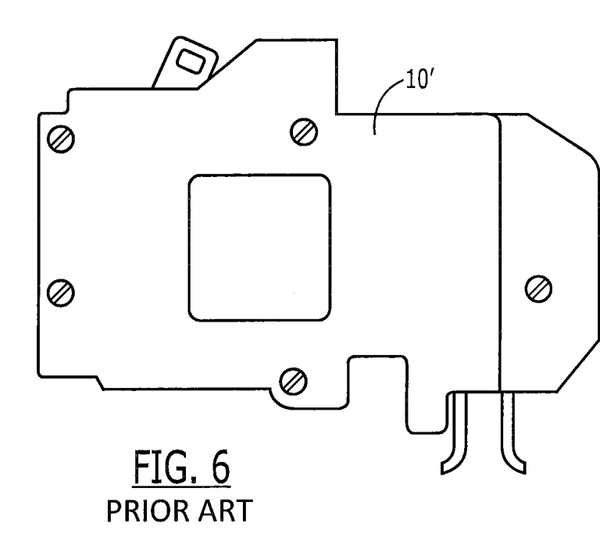
FIG. 6 is a side view of a prior art Type CH AFCI breaker with a plug-on neutral terminal that requires dedicated breaker tooling.

FIG. 6 illustrates an existing Type CH AFCI breaker 10' with a plug-on neutral. The design requires dedicated tooling for the internal neutral terminal. Embodiments of the invention employ a spring clip plug-on neutral 20' for a CR PON breaker.

Figure 7:
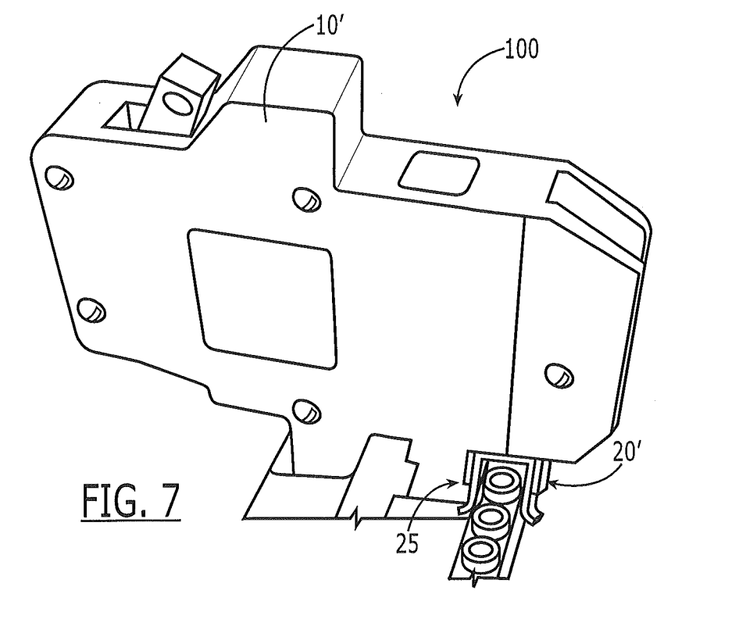
FIG. 7 is a side perspective view of a Type CH AFCI breaker with a plug-on clip assembly neutral terminal according to embodiments of the present invention.

FIG. 7 shows the Type CH AFCI breaker 10' with the plug-on clip assembly 20' which, as described above can be flexibly attached to the neutral conductor to allow up and down movement over a neutral bar 110. Advantageously, this neutral mounting can be added to any AFCI or GFCI breaker that has a neutral conductor rather than requiring a dedicated design such as shown in FIG. 6.

Figure 8:
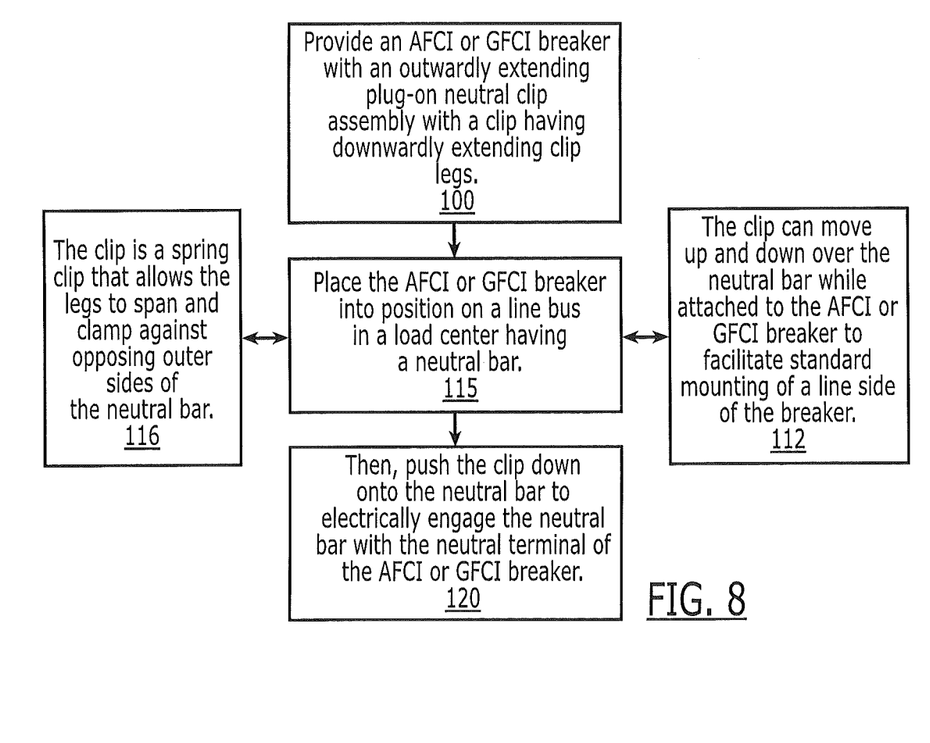
FIG. 8 is a flow chart of exemplary field installation operations that can be used to install the circuit breakers with the plug-on neutral terminal according to embodiments of the present invention.

FIG. 8 is a flow chart of exemplary load center installation operations that can be used according to embodiments of the present invention. As shown, an AFCI or GFCI breaker with an outwardly extending plug-on neutral clip assembly with a clip having downwardly extending clip legs is provided (block 100). The breaker is placed into position on a line bus in a load center having a neutral bar (block 115). Then, the clip can be simply pushed down onto the neutral bar to electrically engage the neutral bar with the neutral terminal of the breaker (block 120).

In some embodiments, the clip can move up and down over the neutral bar while attached to the AFCI or GFCI breaker to facilitate standard mounting of a line side of the breaker (block 112).

The clip can be a spring clip that allow the legs to span and clamp against opposing sides of the neutral bar (block 116).

Figure 9:
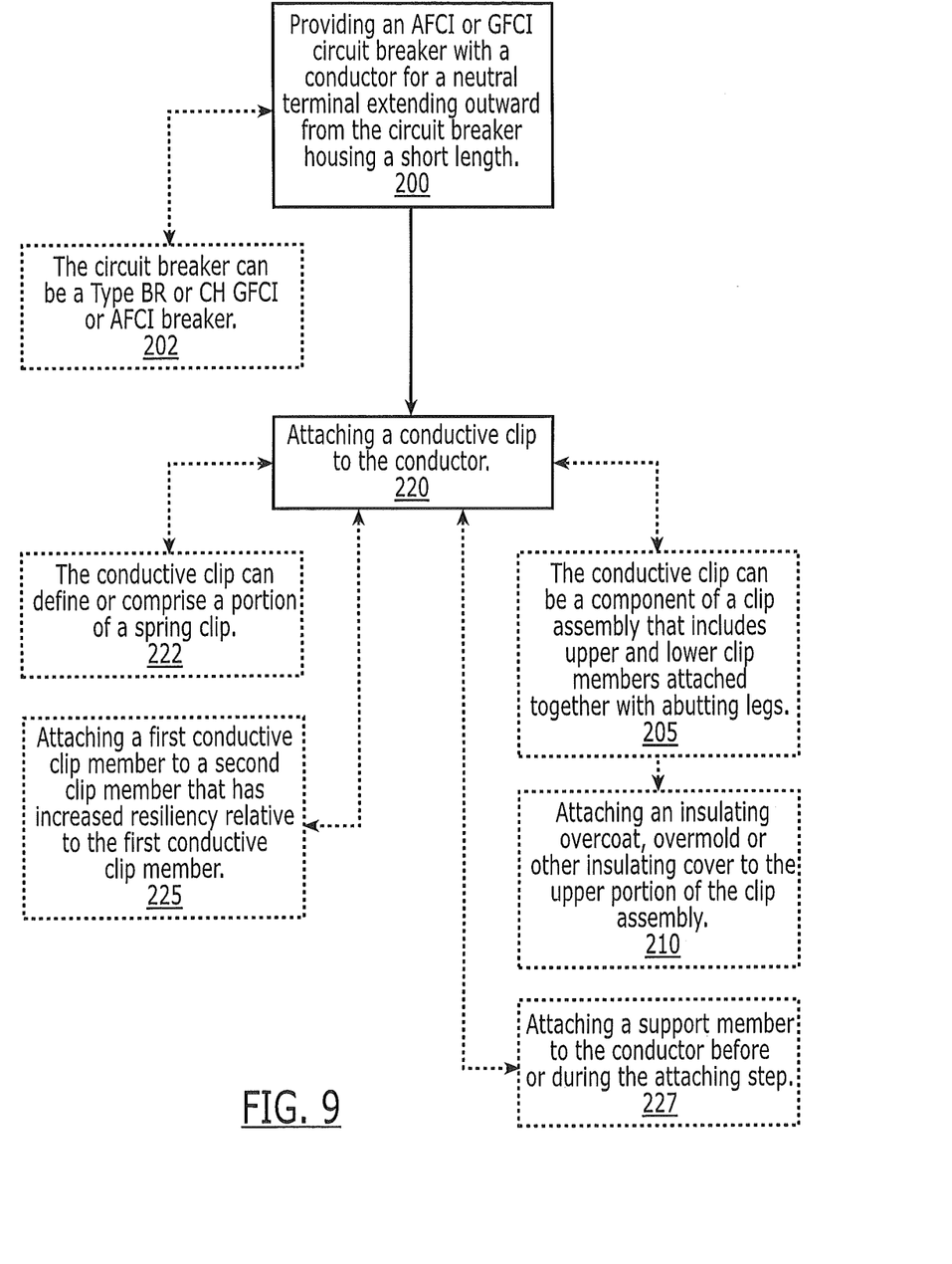
FIG. 9 is a flow chart of exemplary fabrication operations field installation steps that can be used to fabricate a circuit breaker with the plug-on neutral terminal according to embodiments of the present invention.

FIG. 9 is a flow chart of exemplary fabrication operations that can be used to fabricate a circuit breaker with a plug-on neutral according to embodiments of the present invention. An AFCI or GFCI circuit breaker with a conductor for a neutral terminal extending external from (outward from) the circuit breaker housing a defined short length is provided (block 200). A conductive clip is attached to the external conductor (block 220).

The circuit breaker can be a Type BR or CH AFCI or GFCI breaker (block 202). The conductive clip can define or comprise a portion of a spring clip (block 222).

A first conductive clip member can be attached to a second clip member that has increased resiliency relative to the first conductive clip member before the step of block 220 (block 225).

The conductive clip can be a component of a clip assembly that includes upper and lower clip members attached together with abutting legs (block 205).

An insulating overcoat, overmold or other cover can be attached to the upper portion of the clip assembly (block 210).

A support member can be attached to the external conductor before or during the attaching the conductive clip to the conductor step (block 227).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An Arc Fault Circuit Interrupter (AFCI) or Ground Fault Circuit Interrupter (GFCI) circuit breaker, comprising:
   a circuit breaker housing;
   a neutral conductor with an external end portion extending out from the circuit breaker housing; and
   a clip assembly attached to the neutral conductor, the clip assembly comprising a conductive clip with downwardly extending, spaced apart legs configured to contact opposing sides of a neutral bar, wherein the clip assembly is an external extension that resides outside the circuit breaker housing, and wherein the clip assembly comprises an electrically insulating cover that is integrally attached to the neutral conductor and an upper portion of the conductive clip with the legs of the conductive clip free of the cover, and wherein, during operation, the insulating cover is able to pivot up and down with the neutral conductor and conductive clip relative to the circuit breaker housing.

2. The AFCI or GFCI circuit breaker of claim 1, and wherein the clip assembly is configured to pivot up and down relative to the circuit breaker housing to engage a neutral bar, and wherein the legs are sized and configured to clamp against opposing downwardly extending sidewalls of the neutral bar.

3. The AFCI or GFCI circuit breaker of claim 1, wherein the circuit breaker is a Type BR or CH circuit breaker.

4. The AFCI or GFCI circuit breaker of claim 1, wherein the conductive clip of the clip assembly is a spring clip or is part of a spring clip configuration.

5. The AFCI or GFCI circuit breaker of claim 1, wherein the cover has an elongate end portion that extends away from the clip for a length between 0.1 inches to about 6 inches and terminates proximate the circuit breaker housing, and wherein the cover encases the neutral conductor therein.

6. The AFCI or GFCI circuit breaker of claim 1, further comprising an electrically insulating support member configured to hold the external end portion of the neutral conductor, wherein the support member is rigid or semi rigid.

7. The AFCI or GFCI circuit breaker of claim 1, wherein the clip assembly is configured to allow a manual "push down" attachment of the conductive clip to the neutral bar whereby the legs of the conductive clip are pushed outward to clamp against downwardly extending sidewalls of the neutral bar.

8. An Arc Fault Circuit Interrupter (AFCI) or Ground Fault Circuit Interrupter (GFCI) circuit breaker, comprising:
a circuit breaker housing;
a neutral conductor with an external end portion extending out from the circuit breaker housing; and
a clip assembly attached to the neutral conductor the clip assembly comprising a conductive clip with downwardly extending, spaced apart legs configured to contact opposing sides of a neutral bar, wherein the clip assembly is an external extension that resides outside the circuit breaker housing and comprises an electrically insulating support member configured to hold the external end portion of the neutral conductor, wherein the support member is rigid or semi rigid,
wherein the support member and neutral conductor reside inside an electrically insulating external cover, and wherein the cover is an overmold that encases the neutral conductor and support member and defines an integral component.

9. An Arc Fault Circuit Interrupter (AFCI) or Ground Fault Circuit Interrupter (GFCI) circuit breaker, comprising:
a circuit breaker housing;
a neutral conductor with an external end portion extending out from the circuit breaker housing; and
a clip assembly attached to the neutral conductor, the clip assembly comprising a conductive clip with downwardly extending, spaced apart legs configured to contact opposing sides of a neutral bar, wherein the clip assembly is an external extension that resides outside the circuit breaker housing, wherein the clip assembly comprises an upper clip member that snugly abuts the conductive clip so that inner surfaces of the legs of the upper clip member conformably reside against outer surfaces of the legs of the conductive clip, and wherein the upper clip member is an electrical insulator or has a greater electrical resistivity than the conductive clip.

10. The AFCI or GFCI circuit breaker of claim 9, wherein the upper and lower clip members have an inverted substantially U-shape configuration, and wherein the end of the neutral conductor extends through an aperture in a wall of the upper clip member to electrically engage the lower conductive clip.

11. An Arc Fault Circuit Interrupter (AFCI) or Ground Fault Circuit Interrupter (GFCI) circuit breaker, comprising:
a circuit breaker housing;
a neutral conductor with an external end portion extending out from the circuit breaker housing; and
a clip assembly attached to the neutral conductor, the clip assembly comprising a conductive clip with downwardly extending, spaced apart legs configured to contact opposing sides of a neutral bar, wherein the clip assembly is an external extension that resides outside the circuit breaker housing, wherein the clip assembly comprises an external handle residing above the conductive clip accessible to a user during installation onto a load center, and wherein the user can engage the handle to move the conductive clip up and/or down while the clip assembly is attached to the neutral conductor of the AFCI or GFCI circuit breaker.

12. A method of installing an Arc Fault Circuit Interrupter (AFCI) or Ground Fault Circuit Interrupter (GFCI) circuit breaker, comprising:
providing an AFCI or GFCI circuit breaker with a circuit breaker housing and an outwardly extending plug-on neutral clip assembly with a conductive clip having downwardly extending clip legs, wherein the clip assembly is attached to the AFCI or GFCI circuit breaker so that, in operative use, the clip assembly can move up and down relative to the AFCI or GFCI circuit breaker housing, and wherein the clip assembly comprises an electrically insulating cover that is integrally attached to the neutral conductor and an upper portion of the conductive clip with the legs of the conductive clip free of the cover, and wherein, during operation, the insulating cover is able to pivot up and down with the neutral conductor and conductive clip relative to the circuit breaker housing;
placing the AFCI or GFCI breaker into position on a line bus in a load center having a neutral bar; and
pushing down directly onto an upper portion of the clip assembly over the clip or onto a handle attached to an upper portion of the clip assembly to push the clip legs down onto opposing sides of the neutral bar to electrically engage the neutral bar.

13. The method of claim 12, further comprising moving the clip up and down over the neutral bar while the clip assembly remains attached to the breaker housing and externally accessible to a user to facilitate standard mounting of a line side of the AFCI or GFCI circuit breaker.

14. A method of fabricating an Arc Fault Circuit Interrupter (AFCI) or Ground Fault Circuit Interrupter (GFCI) circuit breaker, comprising:
providing an AFCI or GFCI circuit breaker with a housing and a neutral conductor extending externally from the circuit breaker housing a defined short length; and
attaching a clip assembly with an electrically insulating outer cover and a conductive clip to the neutral conductor, wherein the outer cover has a closed surface, and wherein the cover is overmolded onto the neutral conductor and clip to define an integral cover and clip member.

15. The method of claim 14, wherein the circuit breaker is a type BR or CH breaker.

16. The method of claim 14, wherein the conductive clip can define or comprise a portion of a spring clip.

17. The method of claim 14, further comprising attaching a first conductive clip member to a second clip member that has increased resiliency relative to the first conductive clip member, wherein the first and second clip members are nested together with downwardly extending conformably abutting legs to provide the conductive clip to be attached to the external neutral conductor.

18. An Arc Fault Circuit Interrupter (AFCI) or Ground Fault Circuit Interrupter (GFCI) circuit breaker, comprising:
a circuit breaker housing;
a neutral conductor with an external end portion extending out from the circuit breaker housing; and
a flexible clip assembly attached to the neutral conductor, the clip assembly comprising a conductive clip with downwardly extending, spaced apart legs, wherein, in operative use, the clip assembly is configured to be able to move up and down relative to the circuit breaker housing, wherein the conductive clip is sized and configured to contact opposing sides of a neutral bar, and wherein the flexible clip assembly comprises an upper and external integral external electrically insulating cover attached to the neutral conductor and extending over the clip, wherein the clip is a spring clip or forms part of a spring clip that is configured to clamp against opposing downwardly extending sidewalls of the neutral bar.

19. An Arc Fault Circuit Interrupter (AFCI) or Ground Fault Circuit Interrupter (GFCI) circuit breaker, comprising:
a circuit breaker housing;
a neutral conductor with an external end portion extending out from the circuit breaker housing; and
a clip assembly attached to the neutral conductor, the clip assembly comprising a conductive clip with downwardly extending spaced apart legs configured to contact opposing sides of a neutral bar, wherein the clip assembly is an external extension that resides outside the circuit breaker housing and further comprises:
an electrically insulating cover that is attached to the neutral conductor and an upper portion of the conductive clip; and
an externally accessible handle attached to and extending above an upper surface of an external end portion of the cover.

* * * * *

UNITED STATES PATENT AND TRADEMARK OFFICE
CERTIFICATE OF CORRECTION

PATENT NO. : 9,203,231 B2
APPLICATION NO. : 13/873650
DATED : December 1, 2015
INVENTOR(S) : Samuelson et al.

Page 1 of 1

It is certified that error appears in the above-identified patent and that said Letters Patent is hereby corrected as shown below:

In the Specification:
Column 5, Line 37: Please correct "251" to read -- 25*l* --
Column 5, Line 40: Please correct "251" to read -- 25*l* --
Column 5, Line 48: Please correct "251" to read -- 25*l* --
Column 5, Line 51: Please correct "251" to read -- 25*l* --
Column 5, Line 66: Please correct "251 of the clip. The legs 251 can have"
　　　　　　　　　to read -- 25*l* of the clip. The legs 25*l* can have --
Column 6, Line 45: Please correct "about 4,5 inches,"
　　　　　　　　　to read -- about 4.5 inches, --
Column 7, Line 37: Please correct "251." to read -- 25*l*. --
Column 7, Line 40: Please correct "251." to read -- 25*l*. --
Column 7, Line 42: Please correct "251." to read -- 25*l*. --

In the Claims:
Column 12, Claim 19, Line 13: Please correct "extending spaced apart"
　　　　　　　　　to read -- extending, space apart --

Signed and Sealed this
Thirty-first Day of May, 2016

Michelle K. Lee
*Director of the United States Patent and Trademark Office*